United States Patent [19]

Luke et al.

[11] Patent Number: 4,545,596
[45] Date of Patent: Oct. 8, 1985

[54] TRAILER COUPLER

[76] Inventors: Floyd L. Luke, 139 E. Main St.; Mark C. Luke, Rte. 1, both of Michigamme, Mich. 49861

[21] Appl. No.: 495,134

[22] Filed: May 16, 1983

[51] Int. Cl.[4] ............................................. B62D 1/06
[52] U.S. Cl. ..................................... 280/509; 280/508
[58] Field of Search ................... 280/508, 509, 411 R, 280/411 C

[56] References Cited

U.S. PATENT DOCUMENTS

| | | | |
|---|---|---|---|
| 1,335,211 | 3/1920 | Walker | 280/508 |
| 1,401,873 | 12/1921 | Bouller | 280/512 |
| 2,591,916 | 4/1952 | Caughman | 280/504 |
| 2,676,034 | 4/1954 | Tracey | 280/508 |
| 3,013,517 | 6/1959 | Isham | 280/508 |
| 4,133,553 | 1/1979 | Pierce | 280/509 |

Primary Examiner—Joseph F. Peters, Jr.
Assistant Examiner—Donn McGiehan
Attorney, Agent, or Firm—Recka & Joannes

[57] ABSTRACT

A coupler for a trailer reach ball, comprising a housing to be mounted on a vehicle, a pair of pivotally mounted coupling plates; mounted within the housing and extending out of the housing; the plates pivot within a limited arc on counter rotating axis; ball receiving cups are mounted on the coupling plates, spring biasing of the coupling plates holds the cups apart; the ball receiving cups have extending projections to engage a trailer reach; a deadbolt within the housing locks the coupler around the reach ball when the coupler is closed by the insertion of a trailer reach ball.

7 Claims, 8 Drawing Figures

TRAILER COUPLER

BACKGROUND OF THE INVENTION

1. Field of the Invention

This invention relates to couplers for coupling motor vehicles and trailers to be towed by such motor vehicles. The invention is a coupler which closes and locks when a hitch ball is forced within the ball receiving cavity of the coupler.

2. Description of Prior Art

Couplers for coupling vehicles with trailers to be towed are as uncomplicated as hook and pintle connectors. The ball and receiving member on the familiar boat or camper trailer are examples of ball and ball coupler hitches.

Locking mechanisms which lock the trailer ball within the coupling upon insertion of the trailer ball are shown in prior art.

Pierce in U.S. Pat. No. 4,133,553 shows a hinged jaw coupling device with an internal trigger. Isham in U.S. Pat. No. 3,013,517 also shows a coupling device with an internal trigger operating to lock the device when a trailer ball is inserted.

Petitioner's device is designed to hold and lock a trailer connector ball and to eliminate trigger mechanisms mounted within the ball receiving area. These trigger mechanisms become inoperative when filled with debris or when used on a heavy duty operation. They also require numerous moving parts which are subject to fatigue, rusting and wear.

Locking is provided in the petitioner's device by relative movement of massive coupling arms around pivot points mounted within a protective housing.

It is an object of the invention to produce a locking trailer coupler that does not require a separately operated trigger mechanism.

It is an object of the invention to produce a coupler that is of minimum size and with as few moving parts as is possible.

it is an object of the invention to use the relative motion of pivoting coupling arms without a seperate trigger mechanism to effect automatic closure without the necessity of providing a triggering mechanism located in the ball receiving area.

DETAILED DESCRIPTION OF THE PREFERRED EMBODIMENT

Figure 1:
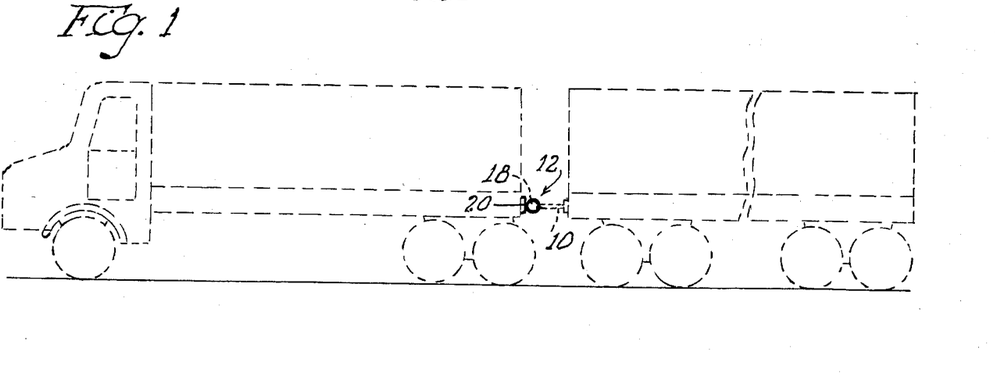
FIG. 1 is a drawing of a typical application of the invention showing a truck and trailer coupled by a means of the coupling device of the invention.

The self closing trailer coupler shown in drawing FIGS. 1 through 8 comprises these numbered parts:
- 10 trailer reach generally see FIG. 2
- 12 vehicle-mounted coupler device
- 14 14' coupling elements
- 15 15' cups
- 16 16' guide plates
- 18 trailer-reach ball
- 20 mounting plate
- 21 guide plate bolts
- 22 22' strikers
- 23 23' recesses for strikers 22 22'
- 24 24' pivot pins
- 26 26' back faces of cups 15 15'
- 28 face of mounting plate 20
- 30 30' half-square notches
- 32 deadbolt
- 33 33' deadbolt receiving apertures in guide plates 16, 16'
- 34 34' flat portions of coupling elements 14 14' being the whole top face of such plates
- 35 deadbolt chamfer
- 36 36' tension springs
- 37 deadbolt stem
- 38 cable
- 40 40' bosses of cupping elements 14 14'
- 42 42' anchoring eyes
- 44 44' round portions of coupling elements 14 14'
- 45 45' grooves
- 46 coupling element limiting slot
- 48 48' faces of flat portions 34 34'
- 50 50' end faces of slot 46 designed to limit opening of coupling
- 52 52' reliefs in cups 15 15'
- 54 54' spacers
- 55 55' bolts
- 56 control lever generally
- 58 portion of control lever 56 which slides in slot 60
- 60 slot in mounting plate 20
- 62 saddle portion of slot 60
- 64 ball on control lever 56
- 66 short section of ell-shaped groove 68
- 68 ell-shaped groove
- 70 safety ridge in slot 60
- 74 deadbolt clearance
- 76 straight portion of slot 60
- 78 upper face of guide plate 16
- 80 handle on control lever
- 82 bottom edge of deadbolt 32
- 84 clevis
- 86 pivot pin in clevis
- 88 fastening thread for clevis
- 90 spring retaining flange
- 92 deadbolt spring
- 94 deadbolt spring retaining bracket
- 96 96' deadbolt spring retaining bracket bolts
- 98 load-bearing portion of deadbolt 32
- 100 safety pin
- 102 102' holes in lugs 104 104'
- 104 104' lugs
- 106 crook portion of control lever 56
- 108 chain
- 110 eyebolt 112 safety bar
114 weatherproof housing
115 holes in mounting plate 20
118 vehicle frame
120 cutout in vehicle frame
122 mounting plate bolts Drawing FIG. 1 shows a vehicle with a towed trailer. Trailer reach or tongue 10 with its connector, trailer reach ball 18, connects the trailer with the towing vehicle by engagement with vehicle mounted coupler 12. The coupler 12 is mounted to the towing vehicle by mounting plate 20. Mounting plate 20 is part of an overall weatherproof housing 114.

The coupler comprises in essence a coupling element ball retained in a lubricated ball receiving socket.

Opposed mirror image coupling elements 14 and 14' are pivotally mounted within an upper guide plate 16 and lower guide plate 16'. The guide plates 16 and 16' are secured to the mounting plate 20 by bolts 21.

Figure 2:
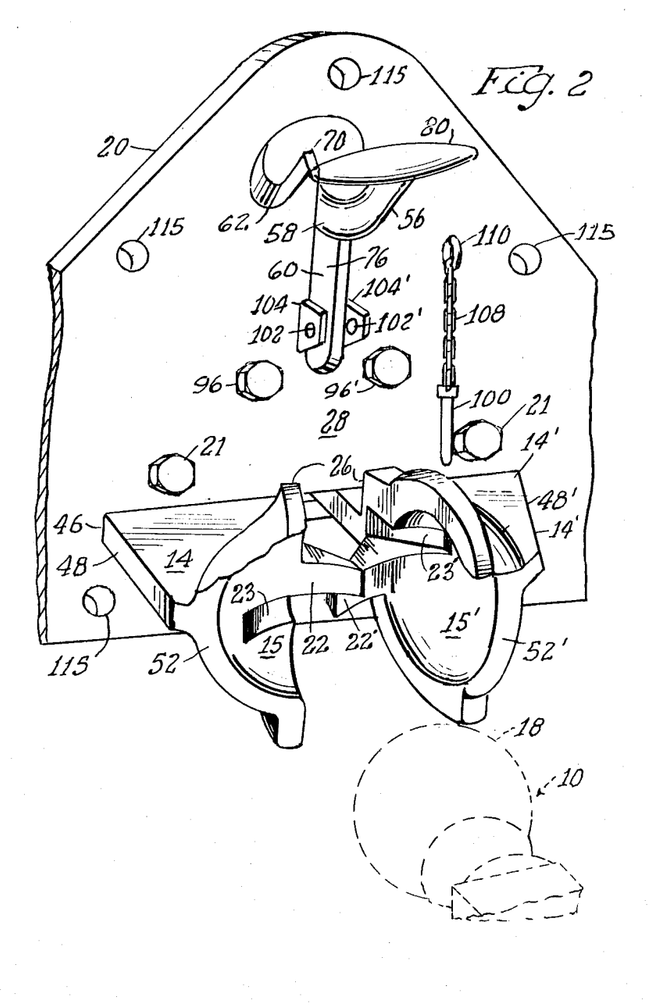
FIG. 2 is a frontal perspective view of the invention in a unlocked or open ball receiving position.
Figure 3:
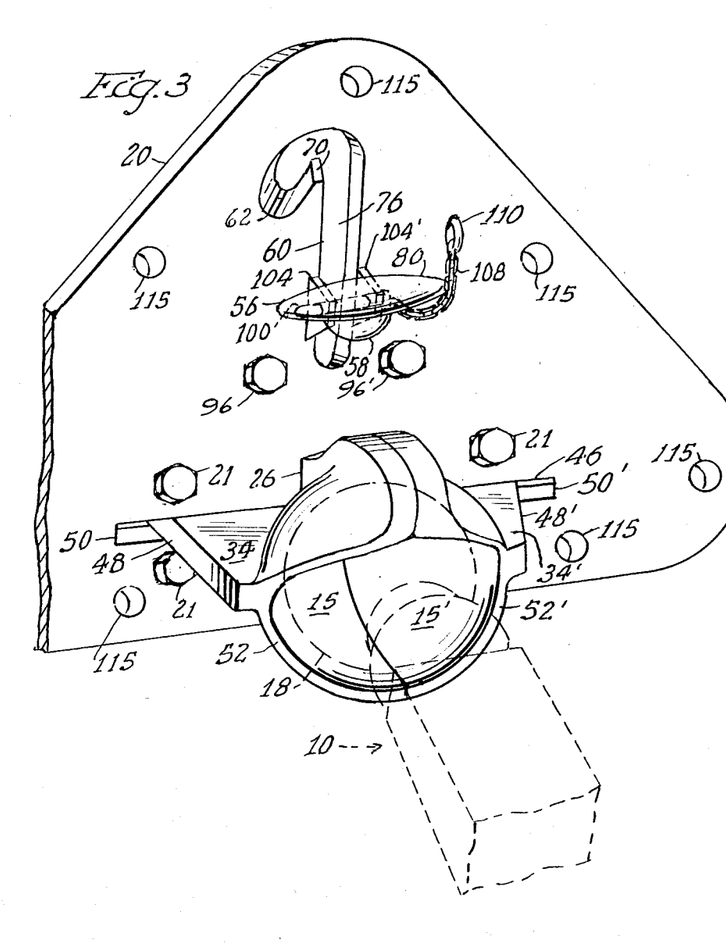
FIG. 3 is a frontal perspective view of the invention in a closed and locked position.
Figure 4:
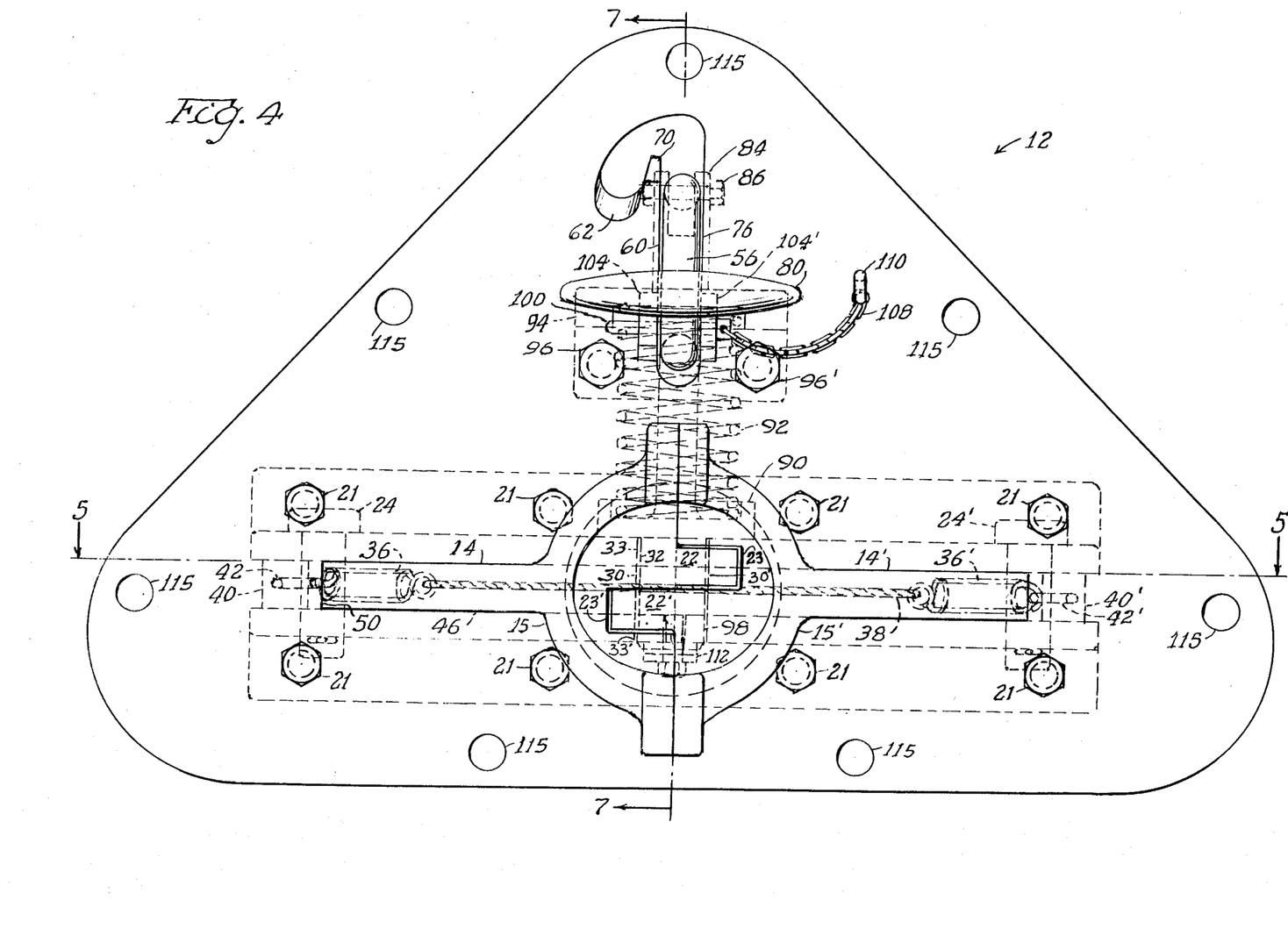
FIG. 4 is a frontal view of the invention with the operating mechanism shown in shadow.

The coupling elements 14 and 14' are shown in Drawing FIG. 2 in open position and in Drawing FIG. 3 in a closed position. The guide plates 16 and 16' can best be seen in the sectional views of Drawing FIGS. 6 and 7.

The forward ends of coupling elements 14 and 14' are formed into cups 15 and 15'. These cups close upon ball 18 of trailer reach member 10 to effect a secure coupling while allowing movement of the ball 18 in a vertical and horizontal plane, such two dimensional plane being generally parallel to the mounting plate 20.

Figure 5:
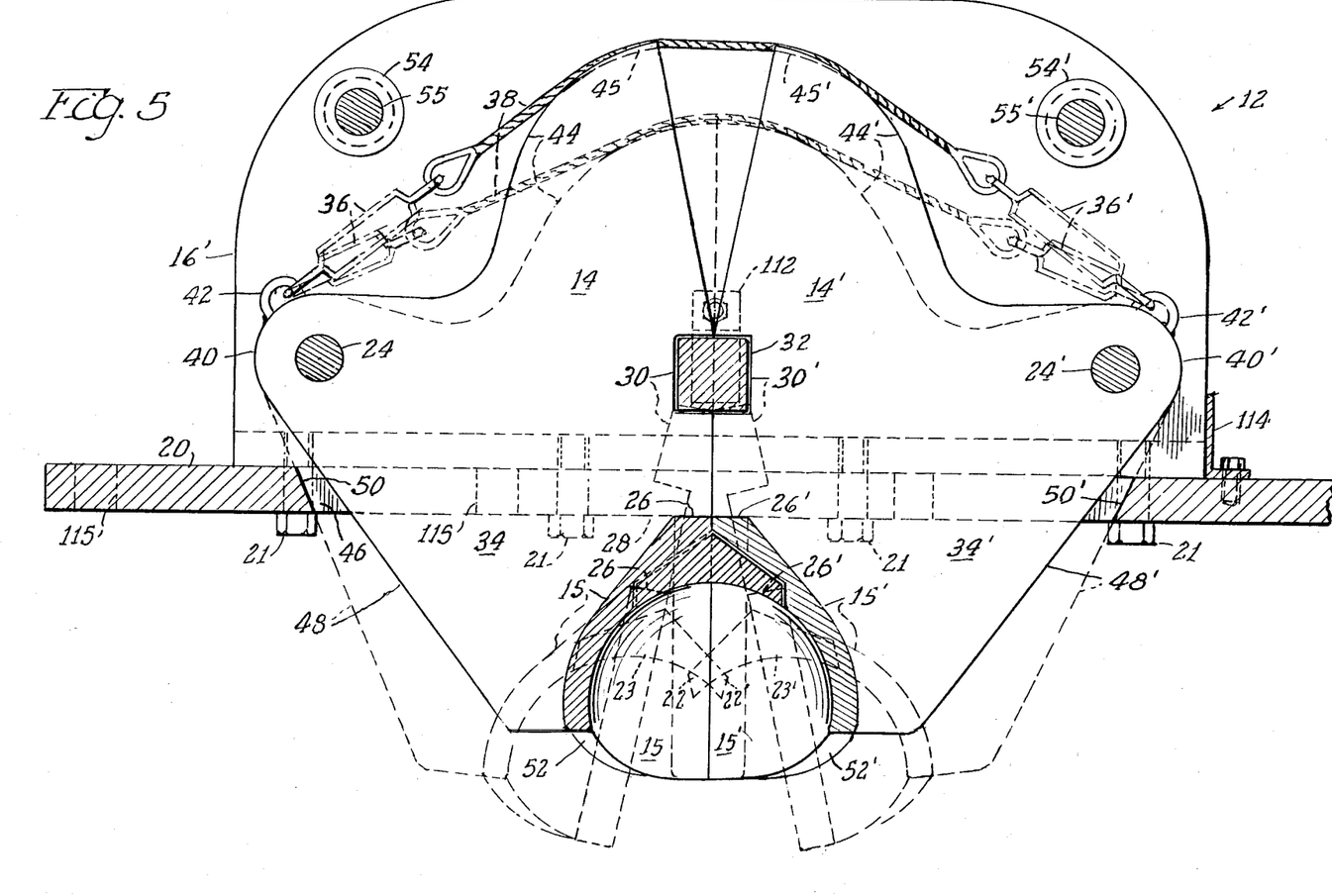
FIG. 5 is a section taken on line 5—5 of FIG. 4 showing closed position in solid lines, open position in dashed lines showing relative displacement of deadbolt receiving notches as jaws are pivoted from an open to closed position about a trailer ball.

Coupling is effected when ball 18 of trailer reach member 10 is forced against closure strikers 22 and 22' of cups 15 and 15'. The relative movement of strikers 22 and 22' as the coupling is closed can be seen in FIG. 2 and FIG. 5. The force exerted against the strikers urges coupling elements 14 and 14' pivotally about their pivot pins 24 and 24' thereby closing cups 15 and 15' around ball 18. FIG. 5 best shows this movement.

STRIKERS

The coupling device will close automatically around a ball inserted within the cups and forced directly back even if no strikers are provided. Such insertion gives rise to a force and moment around the pivot pins which urges the cups closed. However, the insertion into cups with no strikers also gives rise to a wedging force which rapidly wears the rear faces of the cups and makes the device difficult to use.

By mounting strikers on the inside ball contact faces the wedging force is minimized and closng easier. The optimum device would have a minimal distance between the ends of the strikers and further overlap of strikers is preferable.

With out an extended striker and some overlap however inserting the ball can result in the ball being captured by one of the cups and the device not closing.

Provision must be made for nesting the strikers so as to be able to close the cups around the ball.

Extending the strikers as an extension of the curvilinear surface of the inside of the cups and providing a recess in the opposed cup for such strikers allows overlap of the strikers. The overlap eliminates the trapping of the ball by a cup because the striker of the opposite cup extends into the ball receiving area. The extension eliminates as well the wedging force that exists when the strikers do not overlap. The force then, on the jaws results in a smooth turning or pivoting movement about the pivot points of the coupling arms.

The cups are opened wide enough to accept a trailer ball. The cups are kept from opening beyond a certain width spread by the meeting of the rear inner faces of the two coupling elements. Further limits are placed on opening by the width of the slot 60 in the mounting plate. This limited movement can be seen in Drawing FIG. 8.

If the strikers are eliminated operation of the coupler is still possible but with substantially more effort and with rapid wear to the rear perimeters of the cups.

Cups 15 and 15' are displaced backwards towards the mounting plate 20 as the coupling elements 14 and 14' pivot into a closed ball retaining position.

Figure 6:
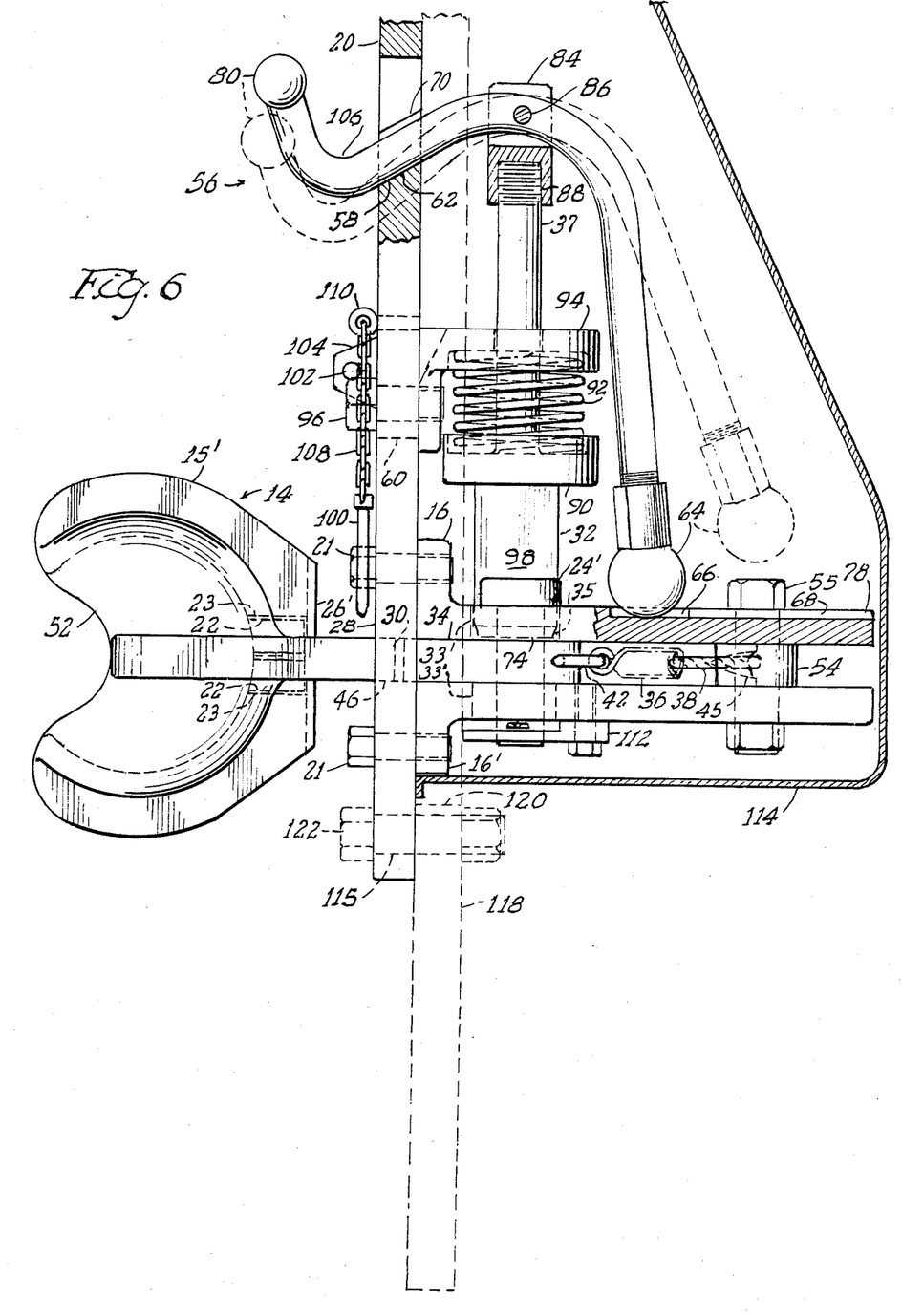
FIG. 6 is a side view of the coupling showing the locking mechanism open.

As can be seen in FIG. 6 back support faces 26 and 26' are formed on the backs of cups 15 and 15'. These support faces are one of the methods used to limit backward movement of the locked cups 15 and 15'. These faces further limit and resist the bending moment exerted on coupling elements 14 and 14' as the towed trailer pitches in travel. Such moment would flex the horizontal flat portions 34 and 34' of coupling elements 14 and 14'.

Figure 7:
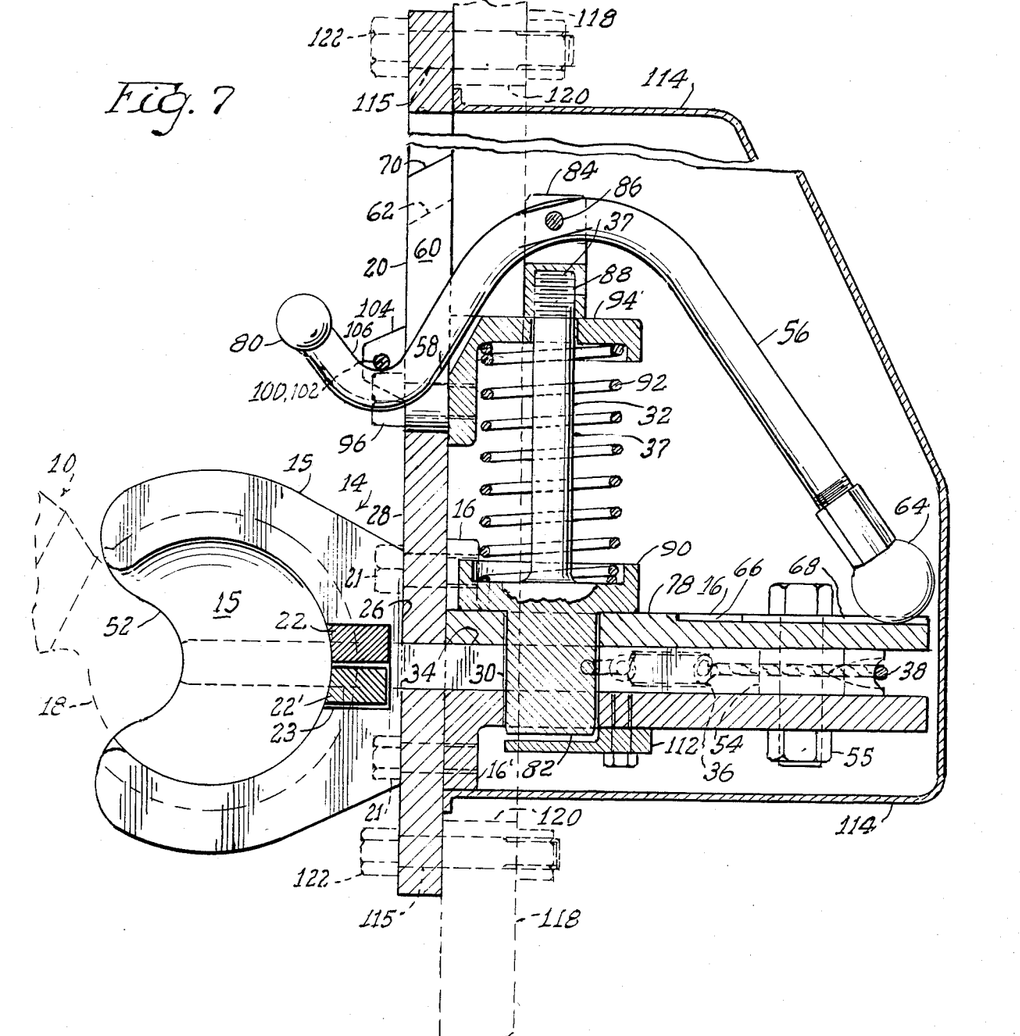
FIG. 7 is an elevational view of the coupling taken on line 7—7 of FIG. 4, with the coupling in a closed, locked position.

Coupling elements 14 and 14' have rectangular deadbolt receiving notches 30 and 30' formed therein. The purpose and function of the notches is best shown in FIG. 5. Pivoting of the coupling elements 14 and 14' brings the two notches together where they form an aperture directly below a spring biased deadbolt 32 which is forced through the aperture locking the coupling device closed around the ball. FIG. 7 is a side view of the locking mechanism.

At locking, the back faces of the cups bear against Face 28 of mounting plate 20, the coupling elements are edge to edge and the deadbolt has been pushed into the deadbolt receiving aperture formed by the mating of the mirror image rectangular slots.

Figure 8:
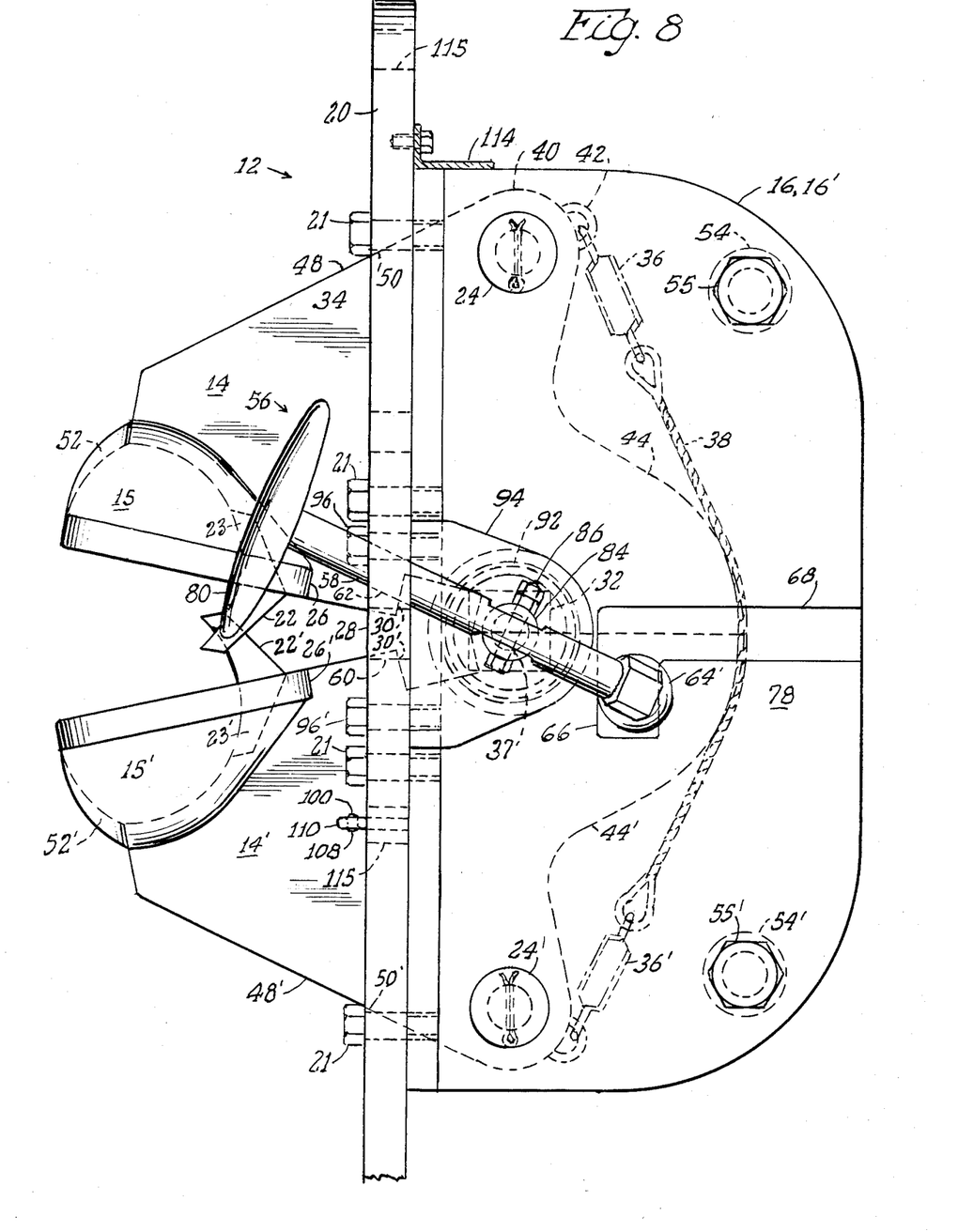
FIG. 8 is a plan view of the coupling in a neutral or safety position.

When the coupling is not engaged, coupling elements 14 and 14' and their associated cups 15 and 15' are spring biased to an open cup separated position by tension springs 36 and 36' connected to cable 38. This spring biasing means can be seen in FIG. 5. Springs 36 and 36' are anchored to bosses 40 and 40' on coupling elements 14 and 14' by means of anchoring edges 42 and 42'. As can be seen in FIG. 5 and 8 they are linked by cable 38. Forward movement of the coupling elements is limited by engagement of the sides of the coupling elements and the width of the opening slot in the housing.

Trained about rounded portions 44 and 44' of coupling elements 14 and 14' spring loaded cable 38 acts to rotate coupling elements 14 and 14' about pivot pins 24 and 24'. Grooves 45 and 45' in rounded portions 44 and 44' of coupling elements 14 and 14' hold cable 38 in central alignment. FIG. 7 shows the groove retainer as does FIG. 6.

The coupling elements pivot about axis displaced back from the face of the device. Pivoting about the displaced points keeps the deadbolt receiving apertures within the housing when the cups are open. This prevents debris from entering the aperatures and interferring with the operation of the deadbolt.

The coupling elements pivot in counter rotating directions towards and away from a common point such point being located along a line passing through the centers of rotation of the pivot points, such point being equidistant from the pivot points. These points are best seen in Drawing FIG. 5; such point of rotation is within the deadbolt receiving aperture when the cups are closed. Location of the common point of rotation within the deadbolt receiving aperture allows manufacture without the need for critical dimensioning of the two coupling elements in the area of the point of common rotation.

Limiting the width of opening of cups 15 and 15' is slot 46 in mounting plate 20. FIGS. 2 and 3 show the limited room provided for opening of the cups. Faces 48 and 48' of flat portions 34 and 34' of the coupling elements 14 and 14' abut the end faces 50 and 50' of slot 46. If the cups were allowed to open to far the strikers would not overlap and the wedging effect of the ball would cause rapid wear.

Control lever 56 is pivotally mounted in clevis 84 by means of pivot pin 86. Clevis 84 is rotably engaged with stem 37 of deadbolt 32 by screw threads 88. When the handle is moved up and down, pivoting is about pin 86, rotation is about threads 88.

DEADBOLT LOCKING MEANS

The deadbolt mechanism is shown in Drawing FIGS. 6 and 7.

Deadbolt 32 retains deadbolt spring 92 by flange 90. The deadbolt is chamfered 35, to ease entry into locking notches 30 and 30'. Spring 92 is retained at its upper end by bracket 94 mounted to mounting plate 20 by spring retaining bracket bolts 96 and 96'.

OPERATION

In neutral or safety position as shown in Drawing FIGS. 6 and 8, neck 58 of control lever 56 is inserted in saddle 62 of slot 60 against spring force; the lower ball end 64 of control lever 56 is at the same time retained in the short section 66 of ell-shaped groove 68 formed in the upper face 78 of guide plate 16.

Placing the control lever in this position is accomplished by raising neck portion 58 of control lever 56 up and over the safety ridge 70 of slot 60 against the resistance of deadbolt pressure spring 92. In neutral position the coupling does not rattle or pound as the vehicle is driven. Deadbolt 32 is held clear of coupling elements 14 and 14' by small clearance 74, cups 15 and 15' are in open position and the control leverd 56 is locked against any possibility of disengagement.

In coupling-ready position shown in FIG. 2 and in shadow in FIG. 6, control lever 56 is raised to move neck 58 up and over Safety ridge 70 of slot 60 into the straight portion 76 of slot 60. In this position control lever 56 swings freely, deadbolt 32 is lowered by the control lever movement and is forced by spring 92 against the flat portions 34 and 34' of coupling elements 14 and 14'.

Cups 15 and 15' in the front shown as reliefs 52 and 52' to allow a greater degree of rotation of the ball through an arc whose axis is normal to the face 28 of the coupler. This allows the towing vehicle to turn in a tighter radius without the shaft to which is attached the ball, engaging the sides of the cup.

Recesses 23 and 23' are formed to nest strikers 22 and 22' of cups 15 and 15' upon closure of the cups. FIG. 3 shows a front view of the recesses. FIG. 7 shows a view of the nested strikers in section.

Guide plates 16 and 16' are spaced apart to provide operating clearances for coupling elements 14 and 14' by spacers 54 and 54' together with bolts 55 and 55'. FIG. 6 as well as FIG. 7 shown the spacers 54 and 54' by means of a sectional view through the coupler. The guide plates resist the flexing of the coupling elements and provide lubricating surfaces for the coupling elements to operate within.

FIGS. 6 and 7 show the deadbolt locking mechanism in open and closed positions respectively.

Deadbolt 32 can be placed in any one of three positions by control lever 56, the neck portion 58 of the control lever operated within inverted "J" configured slot 60 in mounting plate 20. Front views of the operating lever and the "J" slot can be seen in FIGS. 2 and 3.

OPERATING HANDLE

A handle 80 is attached to control lever 56. At the opposite end of control lever 56 is adjustment ball 64. The ball 64 is screwed into threads at the end of the lever. The ball can be screwed in or out to adjust clearance 74 between the bottom edge 82 of deadbolt 32 and the flat portions of 34 and 34'. It also provides for adjustment for wear on ball 64.

As coupling occurs when the trailer reach ball is forced into coupling elements 14 and 14' the elements 14 and 14' pivot around their pivot pins, as the elements 14 and 14' pivot, the square load bearing portion 98 of deadbolt 32 registers with half square notches 30 30' and at the point the notches meet deadbolt 32 is forced through the aperture so formed to become a double shear linchpin simultaneously with the closing of cups 15 and 15' upon ball 18 of trailer reach 10 as shown in FIG. 7.

When coupled, a safety pin through holes 102 and 102' of lugs 104 and 104' across a crook portion of control lever 56 prevents accidentally disengaging the deadbolt. The safety pin 100 is secured to mounting plate 20 by chain 108 and eyebolt 110.

A safety bar 112 fastened to the underside of lower guide plate 16' and underlies deadbolt 32 to prevent loss of deadbolt and the towed vehicle in case of the deadbolts breaking.

The mechanism is weather proofed by means of a housing 114.

Not shown are grease fittings to grease the cups and the sliding faces of coupling elements 14 and 14'.

Mounting holes 116 are provided in mounting plate 20 for attaching to a vehicle frame 118 as in FIGS. 6 and 7. Mounting is accomplished by making cutout 120 in vehicle frame 118 which is also drilled to match holes 116 of mounting plate 20. Mounting plate 20 is bolted to vehicle frame 118 by bolts 122.

I claim:

1. A vehicle mounted coupling device for selectively attaching and releasing one member to and from a spherical member comprising;

a housing affixed to a vehicle;

a first coupling element pivotally mounted to such housing;

a second coupling element pivotally mounted to such housing;

a pair of opposed cup members, mounted to such coupling elements, such coupling elements being pivotal from an open position to a closed position in which the cup members encompass such spherical member;

a deadbolt mounted to the housing;

such coupling elements having deadbolt receiving apertures formed there-through operable to receive such deadbolt when the coupling elements are pivoted to a position in which the cups are closed;

means for urging the deadbolt into such deadbolt receiving apertures;

means for raising such deadbolt to release the cups;

opposed strikers extending outwardly from the rear mating surfaces of the opposed cups into the open space between the cups, such strikers being adapted to receive the inserted spherical member;

such cups having striker nesting recesses formed in the opposed cups, adapted to receive and enclose such strikers when the cups are closed.

2. The coupler of claim 1 wherein the spherical member contacting surface of the striker is formed in the shape of a partial extension of the concave cavity of the cup.

3. A coupling device for coupling a trailer each spherical member to a vehicle comprising:

a housing, such housing being attached to a vehicle;

a first coupling element, pivotally mounted within such housing, such coupling element including a first part extending outwardly from such housing, and a second part mounted within such housing;

a second coupling element pivotally mounted within such housing, such coupling element including a first part extending outwardly from such housing and a second part mounted within such housing;

such first and second coupling elements being mounted adjacent to each other, and in the same plane;

such coupling elements being pivotal along counter rotating axis within a limited arc defined by the abutment of adjacent edges of the coupling elements, such coupling elements being pivotal towards and away from a common point, such common point being located along a line passing through the pivot points of such coupling elements, and being generally equidistant from each such pivot point;

a pair of opposed cup members mounted to the outward extending parts of the coupling elements, such coupling elements being pivotal from an open to a closed position in which the cups encompass such spherical member;

a deadbolt mounted within the housing, operable along a line parallel with the axis of pivoting of the coupling elements;

such coupling elements having deadbolt receiving apertures formed therethrough along the adjacent surfaces of the coupling elements, such apertures being located at a position on the coupling elements so as to meet and form an aperture large enough to accept the deadbolt upon closing of the cups; means for raising the deadbolt to release the spherical member.

4. A coupling devie for coupling a trailer reach spherical member to a vehicle comprising;

a housing, such housing being attached to a vehicle;

a first coupling element, pivotally mounted within such housing, such coupling element including a first part extending outwardly from such housing, and a second part mounted within such housing;

a second coupling element pivotally mounted within such housing, such coupling element including a first part extending outwardly from such housing and a second part mounted within such housing;

such first and second coupling elements being mounted adjacent to each other, such coupling elements being pivotal along counter rotating axis within a limited arc defined by the abutment of adjacent edges of the coupling elements, and by the width of the opening in the housing through which the coupling elements pass, such coupling elements being pivotal towards and away from a common point, such common point being located along a line passing through the pivot points of such coupling elements, and being generally equidistant from each such pivot point;

a pair of opposed cup members mounted to the outward extending parts of the coupling elements, such coupling elements being pivotal from an open to a closed position in which the cups encompass such spherical member;

a deadbolt mounted within the housing, operable along a line parallel with the axis of pivoting of the coupling elements;

such coupling elements having deadbolt receiving apertures formed therethrough along the adjacent surfaces of the coupling elements, and located at a position on the coupling elements so as to meet and form an aperture large enough to accept the deadbolt upon closing of the cups;

means for raising the deadbolt to release the spherical member.

5. The coupling device of claim 4 further comprising spring biasing means operable to urge the coupling elements into an open, spherical member receiving position.

6. The coupling device of claim 4, wherein flats are formed on the cups, adjacent to the housing, abutting the housing, and generally bearing on such housing when the cups are in closed position.

7. The coupling device of claim 4 wherein the forward faces of the cups are relieved to increase allowable horizontal movement of the spherical member in a plane parallel to the direction of travel of the towed vehicle.

* * * * *